United States Patent [19]

Smith et al.

[11] 4,353,565
[45] Oct. 12, 1982

[54] ATTACHMENT FOR AUTOMOTIVE TRAILERS

[75] Inventors: Gary L. Smith, Granite City; Delbert E. Smith, Cahokia; Floyd D. Catterson, Granite City, all of Ill.; Ronald G. Dooley, P.O. Box 38, Madison, Ill. 62060

[73] Assignee: Ronald G. Dooley, Madison, Ill.

[21] Appl. No.: 217,855

[22] Filed: Dec. 18, 1980

[51] Int. Cl.³ .................... B60G 5/06; B62D 27/04
[52] U.S. Cl. ......................................... 280/80 B
[58] Field of Search ............... 280/80 B, 638, 656; 105/363

[56] References Cited

U.S. PATENT DOCUMENTS 4,273,347 6/1981 Hulse .......................... 280/80 B
4,286,797 9/1981 Mekosh, Jr. et al. ........... 280/80 B

*Primary Examiner*—Richard A. Bertsch
*Attorney, Agent, or Firm*—Rogers, Eilers & Howell

[57] ABSTRACT

The slider, to which the rear wheels of an automotive trailer are secured, can be released from that trailer to permit limited forward or rearward movement of that trailer relative to that slider. Sensors are spaced short distances apart along a portion of the length of the trailer, and openings in longitudinal members of that trailer are precisely oriented relative to those sensors. Power-operated locking pins can be selectively withdrawn from those openings to permit relative movement between that slider and that trailer, and thereafter those pins can be driven into those openings to prevent such relative movement. A readout is mounted in the cab of the tractor to enable the driver to precisely determine the relative positions of the slider and trailer and to effect power-controlled unlocking and locking of that trailer and slider.

16 Claims, 5 Drawing Figures

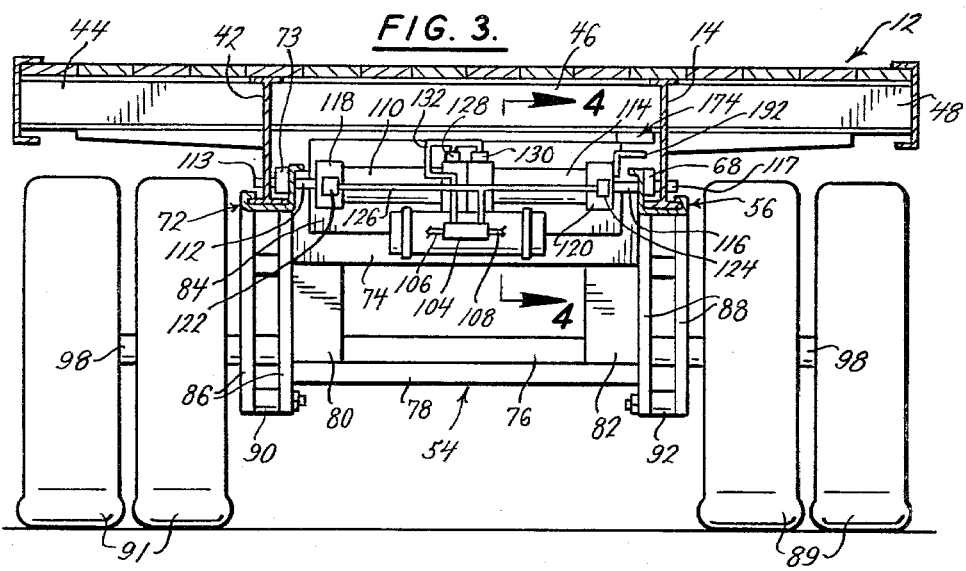
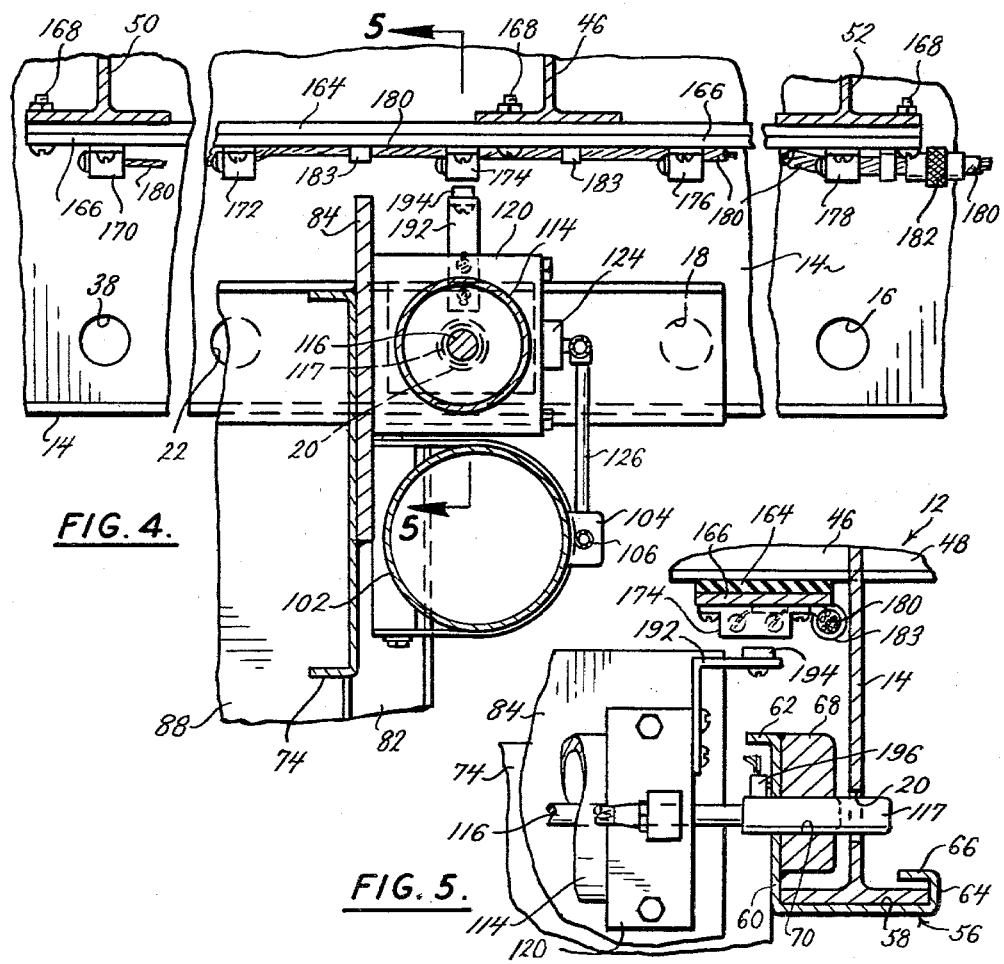

ATTACHMENT FOR AUTOMOTIVE TRAILERS

BACKGROUND OF THE INVENTION

Automotive trailers customarily are equipped with sliders which support the rear wheels of, and which can be shifted limited distances forwardly and rearwardly relative to, those trailers. Each such trailer has longitudinally-extending structural members with spaced openings therein, and the slider has locking pins that can be selectively moved into those openings to lock the trailer and slider together for conjoint movement or can be withdrawn from those openings to permit limited relative movement between that trailer and that slider. A large manually-operated lever is mounted on the slider; and it can be operated by the truck driver or by a helper to selectively withdraw the locking pins from the openings therefor and to subsequently force the locking pins into those openings.

If a helper is available, he can use the large manually-operated lever to withdraw the locking pins from the openings in the longitudinally-extending structural members of the trailer. Thereafter, the driver can actuate a switch in the cab of the tractor to lock the slider-supported wheels against movement, and then use the motive power of the tractor to move the trailer forwardly or rearwardly relative to the slider. The helper can indicate to the driver when the desired openings in the longitudinally-extending structural members of the trailer have been moved into register with the locking pins; and then the driver can brake the tractor to hold those pins and openings in register while the helper uses the manually-operated lever to force the pins into the adjacent openings in the longitudinally-extending structural members. It is desirable for the driver to have a helper available to him when the trailer is to be shifted relative to the slider, because a very considerable force usually is required to operate the lever to pull the pins out of the openings in the longitudinally-extending structural members of the trailer. Also, a helper is useful in determining when the appropriate openings are in register with the locking pins. If a driver does not have a helper, he may find it extremely difficult, and even impossible, to apply sufficient force to the lever to withdraw the pins from the openings in the longitudinally-extending structural members of the trailer. Thereafter, he would have to alight from the cab, check the position of the desired openings in the longitudinally-extending structural members of the trailer relative to the locking pins on the slider, and re-enter the cab to "inch" the trailer relative to the slider, and then repeat the procedure until the desired openings are in exact registry with the locking pins.

It is never easy to use the manually-operated lever to unlock and re-lock a slider relative to a trailer—even when the driver has a helper. It is much more difficult to use the manually-operated lever to effect the unlocking and re-locking of the trailer and slider when the driver does not have a helper. When the driver—with or without a helper—must provide relative movement between the trailer and the slider in icy or rainy weather, the task of using the manually-operated lever to effect an unlocking and re-locking of the trailer and slider becomes unpleasant as well as very difficult.

SUMMARY OF THE PRESENT INVENTION

The present invention provides a slider, to which the rear wheels of an automotive trailer are secured, with power-operated locking pins which can be forced into openings in longitudinal members of that trailer to lock that slider to that trailer, or which can be withdrawn from those openings to free that trailer for limited movement relative to that slider. Sensors are provided along a portion of the length of the trailer; and a readout is mounted in the cab of the tractor to enable the driver to precisely determine the relative positions of the slider and trailer and to effect power-controlled unlocking and locking of that trailer and slider. As a result, a driver can effect a desired amount of relative movement between a slider and a trailer without having to leave the tractor cab. It is, therefore, an object of the present invention to provide a slider, to which the rear wheels of an automotive trailer are secured, with power-operated locking pins which can be forced into openings to lock that slider to that trailer or which can be withdrawn from those openings to free that trailer for limited movement relative to that slider, and also to provide sensors and a readout which will enable a driver to effect a desired amount of relative movement between a slider and a trailer without having to leave the tractor cab.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 3 is a sectional view, on a larger scale, and it is taken along the plane indicated by the line 3—3 in FIG. 1, FIG. 4 is a sectional view on a still larger scale, and it is taken along the plane indicated by the line 4—4 in FIG. 3, and FIG. 5 is a sectional view on the scale of FIG. 4, and it is taken along the plane indicated by the line 5—5 in FIG. 4.

DETAILED DESCRIPTION OF PREFERRED EMBODIMENT

Figure 1:
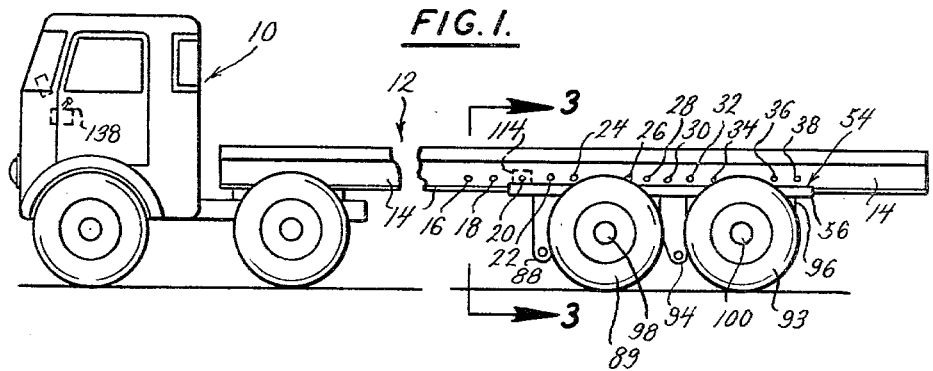
FIG. 1 is a broken side elevational view of an automotive tractor and trailer in which the invention of the present invention has been incorporated.
Figure 2:
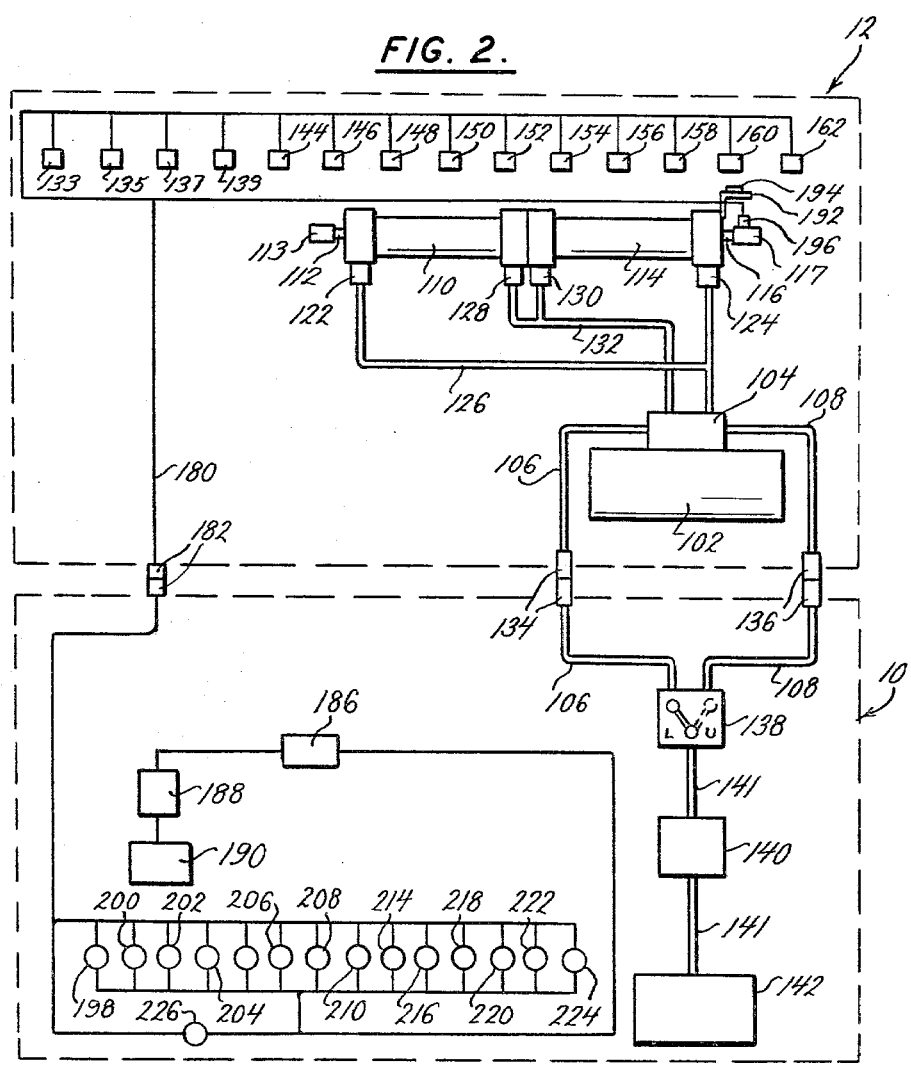
FIG. 2 is a schematic diagram which shows sensors that are displaced longitudinally of the trailer in proximity to the slider for that trailer, which shows pneumatic cylinders that are directed transversely of that trailer and that are mounted on that slider, which shows a readout that is mounted in the tractor cab, and which shows various pneumatic and electrical equipment used with that trailer and slider.

Referring to the drawing in detail, the numeral 10 generally denotes an automotive semi-tractor of standard and usual manufacture and design; and the numeral 12 denotes an automotive trailer of standard and usual manufacture and design which is connectable to, and which can be pulled by, the semi-tractor 10. The overall design and construction of the semi-tractor 10 and the overall design and construction of the trailer 12 are not, per se, parts of the present invention. As a result, almost all conceivable semi-tractors and the trailers therefor can be equipped with the present invention.

The numeral 14 denotes an elongated structural member which is an integral part of the trailer 12; and that member has openings 16, 18, 20, 22, 24, 26, 28, 30, 32, 34, 36 and 38 therein plus two further openings which are not visible in FIG. 1. Those openings are the standard and usual openings that are customarily provided in the longitudinally-extending structural members of automotive trailers which are equipped with sliders. The numeral 42 denotes an elongated structural member which is a mirror image of the elongated structural member 14. The openings in the elongated structural member 42 are coaxial with the openings in the elongated structural member 14. As shown particularly by FIG. 3, the elongated structural members 14 and 42 are spaced apart, but they are parallel to each other. Those structural members are spaced inwardly from the sides of the trailer 12. Although those structural members are shown as large I-beams, their design, construction and dimensions will be determined by the manufacturer of the trailer 12. Transversely-directed connecting beams 44, 46 and 48 are aligned with each other and are suitably secured, as by welds, to the longitudinal-extending structural members 14 and 42. As indicated particularly by FIG. 3, the beam 44 extends outwardly from the outer face of the web of the structural member 42, the beam 46 extends between and interconnects the confronting faces of the webs of the structural members 14 and 42, and the beam 48 extends outwardly from the outer face of the web of the structural member 14.

As indicated particularly by FIG. 4, additional groups of connecting beams are spaced along the length of the trailer 12. Thus, a transversely-directed connecting beam 50 is located forwardly of the transversely-directed connecting beam 46; and outer transversely-directed connecting beams, which are not shown but which are similar to the outer transversely-directed connecting beams 44 and 48, will be aligned with the transversely-directed connecting beam 50. A transversely-directed connecting beam 52 is located rearwardly of the transversely-extending connecting beam 46; and outer transversely-directed connecting beams, which are not shown but which are similar to the outer transversely-directed connecting beams 44 and 48, will be aligned with the transversely-directed connecting beam 52. The number, the size, and the spacing of the various transversely-directed connecting beams that are used in the trailer 12 will be determined by the manufacturer of the trailer and are not a part of the present invention.

The numeral 54 generally denotes the slider for the trailer 12; and that slider can closely resemble the standard and usual sliders which are currently used with automotive trailers. The numeral 56 denotes an elongated, longitudinally-directed formed support which has a sliding surface 58 that underlies and bears against the bottom flange of the elongated structural member 14. The numeral 60 denotes a wall-like portion of the support 56 which extends several inches upwardly above the level of the sliding surface 58. The numeral 62 denotes a flange which extends inwardly from the top edge of the wall 60. The numeral 64 denotes a flange on the support 56 which extends upwardly above the level of the sliding surface 58; and the numeral 66 denotes a lip which extends inwardly from the upper edge of that flange. The numeral 68 denotes a block which has a horizontally-directed hole 70 therein; and that hole is spaced far enough above the sliding surface 58 to dispose it in register with any one of the openings 16, 18, 20, 22, 24, 26, 28, 30, 32, 34, 36 and 38 in the elongated structural member 14.

The numeral 72 denotes a further formed support which is a mirror image of the formed support 56. As indicated particularly by FIG. 3, the vertically-directed wall of the formed member 72 has a block 73 that is a mirror image of the block 68; and the openings in those blocks are coaxial. Also as indicated by FIG. 3, the vertically-directed walls of the formed supports 56 and 72 confront each other; and the flanges which extend inwardly from the top edges of those walls extend toward each other. Those formed supports can be moved limited distances forwardly or rearwardly relative to the longitudinal-extending structural members 14 and 42.

The numeral 74 denotes a transversely-extending spacing member which is fixedly secured, as by welds, to the formed supports 56 and 72. Further transversely-extending spacing members, not shown, also are fixedly secured, as by welds, to those formed supports. The numeral 76 denotes a transversely-extending spacing member which is below the level of, but which is parallel to, the spacing member 74. Further spacing members, not shown, are provided for the slider 54. The number, position and dimensions of the spacing members that are used in making that slider are determined by the manufacturer of the trailer 12 and they can be the same as the number, position and dimensions of the spacing members currently in use on the sliders for automotive trailers. The numeral 78 denotes a tubular spacer which is close to the bottom of the slider 54. Vertical members 80 and 82, which are shown as deep channels, are secured to the spacing member 74 and to the spacing member 76. The vertical member 80 also is secured to the formed support 72; and the vertical member 82 also is secured to the formed support 56. A sturdy metal plate 84 is secured to the rear face of the spacing member 74, as indicated particularly by FIGS. 3 and 4.

The numeral 86 denotes a hanger, of standard and usual design, which is a part of the slider 54. One end of each of the spacers 74 and 76 and one end of the tubular spacer 78 are fixedly connected to that hanger. The numeral 88 denotes another hanger of standard and usual design; and the opposite ends of the spacers 74, 76 and 78 are fixedly connected to that hanger. Further similar hangers 94 and 96 are secured to the slider 54; and those further hangers are located rearwardly of, but in longitudinal alignment with, the hanger 88. Additional similar hangers, not shown, are secured to the slider 54; and those additional hangers are in longitudinal alignment with the hanger 86 while being in transverse registry with the hangers 94 and 96. The numeral 90 denotes a leaf spring which has the forward end thereof supported by the hanger 86 and which has the rear end thereof supported by the hanger, not shown, that is in transverse registry with the hanger 94. The numeral 92 denotes a leaf spring which has the forward end thereof supported by the hanger 88 and which has the rear end thereof supported by the hanger 94. A further leaf spring, not shown, has the ends thereof supported by the hangers 94 and 96; and an additional leaf spring, not shown, has the ends thereof supported by the hangers which are in transverse registry with the hangers 94 and 96.

The numeral 98 denotes an axle which is supported by the leaf springs 90 and 92. The numeral 100 denotes an axle which is supported by leaf springs, not shown, which are supported by the hangers 94 and 96 and by the hangers, not shown, which are in transverse registry with those hangers. A set of dual wheels 89 is supported at one end of the axle 98 and a set of dual wheels 91 is supported at the other end of that axle. A set of dual wheels 93 is supported by one end of the axle 100, and a further set of dual wheels, not shown, is supported by the other end of that axle.

The hangers, leaf springs, axles and dual wheels that are associated with the slider 54 are of standard and usual design. In addition, that slider is equipped with air brakes, air hoses, bearings, and pneumatic fittings of standard and usual kind. The nature, size and positioning of the hangers, leaf springs, axles, dual wheels, brakes, hoses, bearings and fittings are determined by the manufacturer of the trailer, and they are not, per se, parts of the present invention.

The slider 54 differs from customary and usual sliders by being equipped with the plate 84, the blocks 68 and 73, an air tank 102, a valve housing 104 which is connected to that tank, double-acting air cylinders 110 and 114, pistons 112 and 116 for those cylinders, valves 122, 124, 128 and 130, a bracket 192, a permanent magnet 194 mounted on that bracket, a switch 196, and pneumatic fittings and hoses for those cylinders. As shown particularly by FIGS. 3 and 4, supports 118 and 120, for the cylinders 110 and 114, are secured to the front (right-hand) surface of the plate 84 so the pistons 112 and 116 of those cylinders will have the axes thereof at the level of the aligned axes of the various openings in the elongated supporting members 14 and 42. The outer ends of those pistons are threaded and are seated within threaded sockets in the inner ends of locking pins 113 and 117. In the preferred embodiment of the present invention, the diameter of each piston is about one inch, and the diameter of each locking pin is one and five-eighths of an inch. Each piston has a stroke of two inches, and each locking pin is six inches long. The outer ends of those locking pins are dimensioned to extend into various of the aligned openings in the elongated structural members 14 and 42.

As shown particularly by FIG. 5, the switch 196 is mounted on, and is reciprocal with, the locking pin 117. The actuator of that switch will engage the wall portion 45 of the formed support 56, and hence will be forced to "close" that switch, whenever that locking pin has its outer end disposed within one of the longitudinally-spaced openings in the longitudinally-extending structural member 14. However, the actuator will be out of engagement with that wall portion, and hence will permit that switch to "open", whenever that locking pin has its outer end retracted so it cannot be disposed within any of those openings.

The valve 122 communicates with the outer end of the cylinder 110; and it is a pressure protection valve which would cause compressed air within that cylinder to hold the piston 112 in its extended position in the event the supply of air in the compressed air line 126 were to fail. The valve 128 communicates with the inner end of that cylinder, and it is a pressure protection valve which also would cause compressed air within that cylinder to hold the piston 112 in its extended position in the event the supply of air in the compressed air line 132 were to fail. The valve 124 communicates with the outer end of the cylinder 114; and it is a pressure protection valve which would cause compressed air within that cylinder to hold the piston 116 in its extended position in the event the supply of air in the compressed air line 126 were to fail. The valve 130 communicates with the inner end of that cylinder, and it is a pressure protection valve which also would cause compressed air within that cylinder to hold the piston 116 in its extended position in the event the supply of air in the compressed air line 132 were to fail.

The air line 126 is T-shaped; and it is made from standard and usual pneumatic hoses and fittings. The air line 132 also is made from standard and usual pneumatic hoses and fittings. The air line 126 extends from the valve housing 104 to the valves 122 and 124. A four-way disc valve 138 is connected to the valve 104 by an air line 106, and also is connected to the latter valve by an air line 108. That four-way disc valve can be set in a pin-withdrawing position or in a pin-inserting position. When the valve 138 is set in its pin-withdrawing (UNLOCKED) position, the air line 126 and the valves 122 and 124 will permit air from valve 104 and tank 102 to enter the outer ends of the cylinders 110 and 114 and force the pistons 112 and 116, respectively, to withdraw the locking pins 113 and 117 from various of the aligned openings in the elongated structural members 14 and 42. At such time, the valves 128 and 130, the air line 132 and the valve 104 will permit air to escape from the inner ends of those cylinders. Also, the air line 106, the valve 138, and a venting tube connected to the latter valve will permit air to vent to the atmosphere. When the valve 138 is set in its pin-inserting (LOCKED) position, the air line 132 and the valves 128 and 130 will permit air from valve 104 and tank 102 to enter the inner ends of the cylinders 110 and 114 and force the pistons 112 and 116, respectively, to move the locking pins 113 and 117 into various of the aligned openings in the elongated structural members 14 and 42. At such time, the valves 122 and 124, the air line 126 and the valve 104 will permit air to escape from the outer ends of those cylinders. Also, the air line 108, the valve 138, and the venting tube connected to the latter valve will permit air to vent to the atmosphere.

The air line 106 extends from the valve 138 to the air valve 104 to selectively supply air to the tank 102 and to the latter valve. That air line has a quick-connect, quick-disconnect coupling 134 in it of standard and usual design. The air line 108 also extends from the valve 138 to the air valve 104 to selectively supply air to the tank 102 and to the latter valve. That air line has a quick-connect, quick-disconnect coupling 136 in it of standard and usual design. Those quick-connect, quick-disconnect couplings facilitate ready connecting and disconnecting of those air lines whenever the trailer 12 is to be connected to, or separated from, the semi-tractor 10. An air line 141 and a valve 140 connect the main air tank 142 to the valve 138 to enable that tank to supply air to the latter valve.

Various valves could be used as the valve 104; but a Wagner Emergency Valve, Part #A7-1890, of the Wagner Emergency Valve Co. of Brunswick, N.J. is preferred. Various valves could be used as the valves 122, 124, 218 and 130, but Midland Pressure Protection Valves, Part #WO 5-4001, of Midland Valve of Owasso, Wis. are preferred. The hoses that are used in the air lines 116 and 132 preferably are made of one-half inch impolene hoses. Various air cylinders could be used as the cylinders 110 and 114; but twelve inch by four inch pneumatic cylinders with two inch strokes are preferred. Various locking pins 113 and 117 could be used; but, as indicated hereinbefore, locking pins which are six inches in length and one and five-eighths inches in diameter are preferred.

The four-way disc valve 138 is mounted in the cab of the semi-tractor 10 within easy reach of the driver. That valve can be actuated by the driver to cause the main air tank 142 of that semi-tractor to supply air to the air line 108. Although different four-way disc valves could be used, one of the four-way disc valves of the Automatic Air Co. of Charlotte, N.C. is preferred. The valve 140 denotes a shut-off valve which is connected in the air line 141 that extends from the main air tank 142 to the input of the four-way disc valve 138. Although different valves could be used as the shut-off valve 140, a Flipper Valve, Part #KN-2000, of Midland Valve is preferred.

The numerals 133, 135, 137, 139, 144, 146, 148, 150, 152, 154, 156, 158, 160 and 162 denote sensors; each of which can provide a change of state response whenever the permanent magnet 194 is moved into register with it. Although different forms of sensors could be used, magnetically-responsive M-405P reed switches of Alarm Device Mfg. Co. of Syosset, N.Y. are preferred. The numeral 164 denotes an elongated cushioning mounting member of rubber, neoprene or the like which abuts the under surfaces of the transverse connecting members 46, 50 and 52. The numeral 166 denotes an elongated mounting bar of aluminum or other non-magnetic material which underlies the cushioning mounting member 164. That elongated mounting bar and that cushioning mounting member are secured to the lower flanges of the transverse connecting beams 46, 50 and 52 by bolt and nut combinations 168. If desired, the cushioning mounting member 164 could be replaced by three resilient pads that were suitably secured between the lower faces of the cross beams 46, 50 and 52 and the upper surface of the elongated mounting bar 166. In the preferred embodiment of the present invention, the elongated mounting bar 166 is eighty-four inches long, is three inches wide, and is at least one-quarter of an inch thick.

Each of the sensors 133, 135, 137, 139, 144, 146, 148, 150, 152, 154, 156, 158, 160 and 162 is mounted within, and protected by, a housing; and those housings are secured to the elongated mounting plate 166 by self-tapping screws or the like. Some of those housings are shown in FIG. 4; and they are denoted by the numerals 170, 172, 174, 176 and 178. A multiconductor cable 180 has a common conductor extending to each of the sensors 133, 135, 137, 139, 144, 146, 148, 150, 152, 154, 156, 158, 160 and 162; and it also has fourteen additional conductors, each of which is dedicated to a different one of those sensors. Further, that cable has an additional conductor which is connected to the switch 196 by a standard, readily-flexible conductor. A ready-connect, ready-disconnect, waterproof plug and socket 182 is provided for that cable. That plug and socket facilitate ready connecting and disconnecting of that cable whenever the trailer 12 is to be connected to, or separated from, the semi-tractor 10. Clips 183 are used to hold the cable 180 securely against the under surface of the elongated mounting bar 166. Although fourteen sensors have been provided, more or fewer sensors could be used. In most instances, the number of sensors will be in the range of ten to eighteen. Also, the center-to-center spacings of those sensors, and hence also the openings 16, 18, 20, 22 and 24, of the opening obscured by wheel 89, of the openings 26, 28, 30, 32, 34, of the opening obscured by wheel 93, and of the openings 36 and 38, preferably is six inches.

The numeral 198 denotes a lamp which is mounted within a housing behind a colored bezel that bears the numeral "1". In the preferred embodiment of the present invention, that bezel is colored red, it is mounted in the front of that housing, and that housing is mounted within the cab of the semi-tractor 10 within the viewing area of the driver. The numerals 200, 202, 204, 206, 208, 210, 212, 214, 216, 218, 220, 222 and 224 denote further lamps which are mounted in the front of that housing behind similar bezels which, respectively, bear the numerals "2" through "14". Each of those lamps is connected to one of the sensors 133, 135, 137, 139, 144, 146, 148, 150, 152, 154, 156, 158, 160 and 162 by appropriate ones of the conductors in the cable 180.

The numeral 226 denotes a lamp which is located within the front of the housing, that contains the lamps 198, 200, 202, 204, 206, 208, 210, 212, 214, 216, 218, 220, 222 and 224, and that lamp is mounted behind a bezel marked LOCKED. That lamp is connected to the switch 196 by one of the conductors of the cable 180. The numeral 186 denotes a manually-operated switch that is located in the cab of the semi-tractor 10 within easy reach of the driver. That switch can respond to power from the main fuse block 190 of that semi-tractor, and from an in-line fuse 188, to supply power to one terminal of each of the lamps 198, 200, 202, 204, 206, 208, 210, 212, 214, 216, 218, 220, 222, 224 and 226.

Whenever the switch 186 is in its "open" position, all of the lamps 198, 200, 202, 204, 206, 208, 210, 212, 214, 216, 218, 220, 222, 224, and 226 will be "dark". Whenever that switch is in its "closed" position, at a time when the valve 138 is in its LOCKED position, the permanent magnet 194 will be adjacent one of the sensors 133, 135, 137, 139, 144, 146, 148, 150, 152, 154, 156, 158 160 and 162; and the locking pin 117 will have its outer end disposed within an opening in the structural member 14 so the switch 196 will be "closed". At such time, the sensor which is immediately adjacent the permanent magnet 194 will be "closed" and the corresponding lamp in the cab of the semi-tractor 10 will be illuminated. Also, the lamp 226 will be illuminated to indicate to the driver that the outer ends of the locking pins 113 and 117 are disposed within openings in the elongated structural members 14 and 42.

If the driver concludes that the trailer 12 and the slider 54 occupy desired relative positions, he will then re-open the switch 186. However, if the driver concludes that he should shift the trailer 12 relative to the slider 54, he will leave the switch 186 in its "closed" position, he will shift the valve 138 to its UNLOCKED position, and then he will close a switch or valve, not shown, of standard and usual type which will cause the brakes on the slider 54 to be set. The shifting of the valve 138 into its UNLOCKED position will cause air from the tank 102 to pass through valve 104, air line 126, valves 122 and 124 and into cylinders 110 and 112. Simultaneously, the air that had been in the inner ends of those cylinders will pass via valves 128 and 130, air line 132 and valve 104 to be vented to the atmosphere. Thereupon, the outer ends of the locking pins 133 and 117 will be withdrawn from the openings in the elongated structural members 14 and 42, so the trailer 12 can be shifted longitudinally relative to the slider 54. As the locking pin 117 moves inwardly, the actuator of switch 196 will move out of engagement with the vertically-directed wall of the formed member 56, and hence that switch will "open". Thereupon, the lamp 226 will become "dark".

At such time, the driver can use the motive power of the semi-tractor 10 to "inch" the trailer 12 forwardly or rearwardly relative to the slider 54; because that slider will be held stationary by the set brakes thereof. The permanent magnet 194 will remain stationary with the slider 54, but the sensors 133, 135, 137, 139, 144, 146, 148, 150, 152, 154, 156, 158, 160 and 162 will move with the trailer 12. As a sensor moves into registry with the permanent magnet 194, that sensor will close the circuit to the lamp which corresponds to it; and the resulting illumination of that lamp will indicate to the driver when the locking pins 113 and 117 are in register with the openings which correspond to that sensor and lamp. Reed switches are preferred as sensors because they can remain in their "open" positions until the permanent magnet 194 is squarely in register with them; and hence they can make certain that whenever the lamps corresponding to them are illuminated, the openings corresponding to them will be squarely in register with the locking pins 113 and 117.

The driver of the semi-tractor 10 can shift the trailer 12 forwardly or rearwardly relative to the slider 54 until the desired lamp is illuminated. At such time, the driver will brake the semi-tractor 10, and then shift the valve 138 into its LOCKED position. Thereupon, air from the tank 102 will pass through valve 104, air line 132 and valves 128 and 130 into the cylinders 110 and 114 to force the outer ends of the locking pins 113 and 117 into the openings with which they are in register. Simultaneously, the air which previously was in those cylinders will vent to the atmosphere via valves 122 and 124, air line 126 and valve 104. As the locking pin 117 moves into the opening, in the elongated structural member 14, that is in register with it, the actuator on switch 196 will engage the vertically-directed wall of the formed member 56 and "close" that switch. Thereupon, the lamp 226 will become illumined to advise the driver that the locking pins 113 and 117 have moved into locking position to lock the trailer 12 and the slider 54 for conjoint movement. At such time, the driver can re-open the switch 186 to "darken" all of the lamps.

In using the present invention to unlock the trailer 12 from the slider 54, and then to subsequently re-lock that trailer to that slider, the driver does not have to alight from the cab of the semi-tractor 10. Moreover, he does not have to mechanically remove locking pins from openings in the elongated structural members of that trailer. Instead, he merely closes the switch 186, shifts the actuator of the valve 138, sets the brakes on the slider 54, uses the motive power of the semi-tractor 10 to shift the trailer relative to the slider until the desired lamp is illumined, shifts the actuator of valve 138 back to its locked position, and then re-opens the switch 186. As a result, the present invention makes it possible for a driver to quickly shift the trailer 12 relative to the slider 54 without having to alight from the cab or to expend any more effort than is required to actuate switches and valves. In this way, the present invention obviates all need of a helper, and also obviates all of the unpleasantness, strain and danger which presently are involved in shifting the position of a trailer relative to the slider therefor. Also, the present invention obviates all need of the large lever that is presently provided on sliders to move the locking pins into and out of locking position.

The main air tank 142 receives and stores air from the air compressor that is standard equipment on the semi-tractor 10. That main air tank will, via valves 140, 138 and 104, supply air to the tank 102. Also, that main air tank will supply the air which valve 138 will use to actuate the valve 104.

It is preferable to mount the cylinders 110 and 114 on the slider 54 and to locate the openings 16, 18, 20, 22, 24, 26, 28, 30, 32, 34, 36 and 38 and their counterparts in structural members of the trailer 12. However, if desired, those cylinders could be mounted on that trailer, and those openings could be located in the vertically-directed walls of the formed supports 56 and 72 of the slider 54.

It will be noted that the pneumatic cylinders 110 and 114 are located between the trailer 12 and the slider 54. Also, it will be noted that those pneumatic cylinders are located between the wheels 89 and 91. This is desirable, because it enables that trailer, that slider and those wheels to shield and protect those pneumatic cylinders.

Whereas the drawing and accompanying description have shown and described a preferred embodiment of the present invention, it should be apparent to those skilled in the art that various changes may be made in the form of the invention without affecting the scope thereof.

What we claim is:

1. A power-actuated locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a power-actuated locking and unlocking member that is mounted on and movable with one of said objects, a plurality of longitudinally-spaced surfaces on the other of said objects that can be selectively engaged by said power-actuated locking and unlocking member, said power-actuated locking and unlocking member being selectively responsive to the application of power to move into locking engagement with various of said longitudinally-spaced surfaces on said other of said objects to lock said objects together in various longitudinally-spaced positions, said power-actuated locking and unlocking member being selectively responsive to the application of power to move to a position wherein it is out of locking engagement with all of said longitudinally-spaced surfaces on said other of said objects to free said objects for relative forward or rearward movement, and said power-actuated locking and unlocking member and any one of said longitudinally-spaced surfaces being adapted to prevent relative forward or rearward movement of said objects and hence to insure conjoint movement of said objects whenever said power-actuated locking and unlocking member responds to the application of power to move into locking engagement with said one of said longitudinally-spaced surfaces, said power-actuated locking and unlocking member being separate from, and being independent of, all braking systems for said automotive trailer.

2. A power-actuated locking and unlocking system as claimed in claim 1 wherein said power-actuated locking and unlocking member includes a pneumatic cylinder, wherein said longitudinally-spaced surfaces are the bounding portions of openings, wherein said pneumatic cylinder selectively responds to the application of compressed air to move a locking surface into various of said openings, and wherein said pneumatic cylinder selectively responds to the application of compressed air to move said locking surface out of said various openings.

3. A power-actuated locking and unlocking system as claimed in claim 1 wherein said power-actuated locking and unlocking member includes a pneumatic cylinder that is directed transversely of said one of said objects, wherein said longitudinally-spaced surfaces are the bounding portions of openings within a longitudinally-extending structural member of said other of said objects, wherein said pneumatic cylinder selectively responds to the application of compressed air to move a locking surface into various of said openings, and wherein said pneumatic cylinder selectively responds to the application of compressed air to move said locking surface out of said various openings.

4. A power-actuated locking and unlocking system as claimed in claim 1 wherein said power-actuated locking and unlocking member includes a pneumatic cylinder, wherein a valve for said pneumatic cylinder selectively permits compressed air to enter and exhaust from said pneumatic cylinder, wherein said longitudinally-spaced surfaces are the bounding portions of openings, wherein said pneumatic cylinder selectively responds to the application of compressed air to move a locking surface into various of said openings, wherein said pneumatic cylinder selectively responds to the application of compressed air to move said locking surface out of said various openings, and wherein said valve will hold compressed air within said pneumatic cylinder and thereby cause said pneumatic cylinder to hold said locking surface in any adjacent opening in the event the supply of compressed air, which is supplied to said valve for application to said pneumatic cylinder, is discontinued.

5. A power-actuated locking and unlocking system as claimed in claim 1 wherein said power-actuated locking and unlocking member is located between, and hence is shielded and protected by, said objects.

6. A power-actuated locking and unlocking system as claimed in claim 1 wherein said power-actuated locking and unlocking member includes a pneumatic cylinder, wherein said pneumatic cylinder selectively responds to the application of compressed air to move a locking surface into various of said openings, wherein said pneumatic cylinder selectively responds to the application of compressed air to move said locking surface out of said various openings, wherein said locking surface is a locking pin secured to the piston of said pneumatic cylinder, and wherein said locking pin is confined and guided for reciprocal movement relative to various of said openings by a guide member.

7. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, a sensor which senses the position of said locking member longitudinally of said longitudinally-spaced surfaces and which can indicate when said locking member is in register with a predetermined one of said longitudinally-spaced surfaces, an indicator which can respond to said sensor to indicate when said locking member is in register with said predetermined one of said longitudinally-spaced surfaces, and selectively-operated means which can actuate said locking member to cause said locking member to move into locking engagement with said predetermined one of said longitudinally-spaced surfaces.

8. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, a sensor which senses the position of said locking member longitudinally of said longitudinally-spaced surfaces and which can indicate when said locking member is in register with a predetermined one of said longitudinally-spaced surfaces, said sensor being mounted adjacent said objects, and an indicator which responds to said sensor but which is remote from said objects, said indicator being located so it is within the sensing range of the driver of the automotive tractor which pulls said automotive trailer.

9. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, a sensor which senses the position of said locking member longitudinally of said longitudinally-spaced surfaces and which can indicate when said locking member is in register with a predetermined one of said longitudinally-spaced surfaces, further sensors which can indicate when said locking member is in register with further predetermined ones of said longitudinally-spaced surfaces, the first said and said further sensors being mounted adjacent said objects, and an indicator which responds to said sensors but which is remote from said objects, said indicator being located so it is within the sensing range of the driver of the automotive tractor which pulls said automotive trailer.

10. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, a sensor which senses the position of said locking member longitudinally of said longitudinally-spaced surfaces and which can indicate when said locking member is in register with a predetermined one of said longitudinally-spaced surfaces, further sensors which can indicate when said locking member is in register with further predetermined ones of said longitudinally-spaced surfaces, said sensors being circuit-closing devices, and said sensors being mounted adjacent said objects, and an indicator which responds to said sensors but which is remote from said objects, said indicator being located so it is within the sensing range of the driver of the automotive tractor which pulls said automotive trailer.

11. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, said locking member including a pneumatic cylinder, said longitudinally-spaced surfaces being the bounding portions of openings, said pneumatic cylinder selectively moving a locking surface into or out of various of said openings, a sensor which senses the position of said locking member longitudinally of said longitudinally-spaced surfaces and which can indicate when said locking member is in register with a predetermined one of said openings, a further sensor which can indicate when said locking surface is within any one of said openings, and an indicator which responds to said sensors but which is remote from said objects, said indicator being located so it is within the sensing range of the driver of the automotive tractor which pulls said automotive trailer.

12. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, said locking member including a pneumatic cylinder, said longidutinally-spaced surfaces being the bounding portions of openings, said pneumatic cylinder selectively moving a locking surface into or out of various of said openings, a sensor which senses the position of said locking member longitudinally of said longitudinally-spaced surfaces and which can indicate when said locking member is in register with a predetermined one of said openings, a further sensor which can indicate when said locking surface is within any one of said openings, an indicator which responds to said sensors but is remote from said objects, the first said sensor being electrical, said further sensor being electrical, and said indicator being electrical, said indicator being located so it is within the sensing range of the driver of the automotive tractor which pulls said automotive trailer.

13. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, said locking member including a pneumatic cylinder, said longitudinally-spaced surfaces being the bounding portions of openings, said pneumatic cylinder selectively moving a locking surface into or out of various of said openings, a sensor which senses the position of said locking member longitudinally of said longitudinally-spaced surfaces and which can indicate when said locking member is in register with a predetermined one of said longitudinally-spaced surfaces, said sensor being displaced from said predetermined one of said longitudinally-spaced surfaces, and an indicator which responds to said sensor but which is remote from said objects, said indicator being located so it is within the sensing range of the driver of the automotive tractor which pulls said automotive trailer.

14. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, said locking member including a pneumatic cylinder, said longitudinally-spaced surfaces being the bounding portions of openings, said pneumatic cylinder selectively moving a locking surface into or out of various of said openings, a plurality of sensors which sense the position of said locking member longitudinally of said longitudinally-spaced surfaces and which can indicate when said locking member is in register with said longitudinally-spaced surfaces, said sensors being displaced from said longitudinally-spaced surfaces but having spacings and orientations which are similar to the spacings and orientations of said longitudinally-spaced surfaces, and an indicator which responds to said sensors but which is remote from said objects, said indicator being located so it is within the sensing range of the driver of the automotive tractor which pulls said automotive trailer.

15. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, a sensor which senses the position of said locking member longitudinally of said longitudinally-spaced surfaces and which can indicate when said locking member is in register with a predetermined one of said longitudinally-spaced surfaces, a further sensor which can indicate when said locking member is in engagement with said predetermined one longitudinally-spaced surface, and said sensors being adjacent said objects.

16. A locking and unlocking system for two relatively-movable objects which can be selectively locked together for conjoint movement or which can be unlocked for movement relative to each other, said objects being an automotive trailer and a wheel-supporting slider for said automotive trailer which is adjacent the rear of said automotive trailer, said system comprising interacting relatively-movable surfaces on said objects which can permit relative forward or rearward movement of said objects, a locking member that is mounted on and movable with one of said objects, a plurality of longitudinally-spaced surfaces on the other of said objects that can be selectively engaged by said locking member to lock said objects together in various longitudinally-spaced positions, and said locking member and any one of said longitudinally-spaced surfaces being adapted to prevent relative forward or rearward movement of said objects and hence to insure conjoint movement of said objects whenever said locking member is in locking engagement with said one of said longitudinally-spaced surfaces, a sensor which senses the position of said locking member longitudinally of said longitudinally-spaced surfaces and which can indicate when said locking member is in register with a predetermined one of said longitudinally-spaced surfaces, a further sensor which can indicate when said locking member is in engagement with said predetermined one longitudinally-spaced surface, said sensors being adjacent said objects, indicating means which can respond to the first said sensor to provide an indication when said locking member is in register with said predetermined one longitudinally-spaced surface and also can respond to said further sensor to provide an indication when said locking member is in engagement with said predetermined one longitudinally-spaced surface, and said indicating means being remote from said objects and being within the sensing range of the driver of the automotive tractor which pulls said automotive trailer.

* * * * *